United States Patent
Bunger (10) Patent No.: US 10,101,098 B2
(45) Date of Patent: Oct. 16, 2018

(54) THERMAL INSULATION SYSTEM USING EVAPORATIVE COOLING

(71) Applicant: Red Leaf Resources, Inc., South Jordan, UT (US)

(72) Inventor: James Bunger, South Jordan, UT (US)

(73) Assignee: Red Leaf Resources, Inc., Salt Lake City, UT (US)

( * ) Notice: Subject to any disclaimer, the term of this patent is extended or adjusted under 35 U.S.C. 154(b) by 376 days.

(21) Appl. No.: 14/879,699

(22) Filed: Oct. 9, 2015

(65) Prior Publication Data

US 2016/0102927 A1    Apr. 14, 2016

Related U.S. Application Data

(60) Provisional application No. 62/062,328, filed on Oct. 10, 2014.

(51) Int. Cl.
*F28F 13/00* (2006.01)
*F16L 59/02* (2006.01)
*E21B 43/24* (2006.01)

(52) U.S. Cl.
CPC .............. *F28F 13/00* (2013.01); *E21B 43/24* (2013.01); *F16L 59/02* (2013.01)

(58) Field of Classification Search
CPC . E21B 43/24; F16L 59/02; F28F 13/00; F28F 13/003
USPC ....................... 261/127, 152, 154, 95, 96, 97
See application file for complete search history.

(56) References Cited

U.S. PATENT DOCUMENTS

| | | | |
|---|---|---|---|
| 4,029,081 A | 6/1977 | Strong | |
| 4,389,794 A | 6/1983 | Bitterly | |
| 7,862,705 B2 | 1/2011 | Dana et al. | |
| 8,739,856 B2 * | 6/2014 | Fedorov | G06F 1/20 165/80.4 |
| 9,365,777 B2 * | 6/2016 | Patten | C10G 1/045 |
| 9,482,467 B2 * | 11/2016 | Patten | C10G 1/002 |
| 9,731,897 B2 * | 8/2017 | Patten | B65G 5/00 |

(Continued)

FOREIGN PATENT DOCUMENTS

DE    10 2011 107 160    8/2012
WO    WO 2001/081715    1/2001

OTHER PUBLICATIONS

Vafai, K. & S. Whitaker, Simultaneous Heat and Mass Transfer Accompanied by Phase Change in Porous Insulation, *Journal of Heat Transfer*, Feb. 1986, 108: 132-140.

*Primary Examiner* — Charles Bushey
*Assistant Examiner* — Scott Bushey
(74) *Attorney, Agent, or Firm* — Thorpe North & Western, LLP (57) ABSTRACT

A thermal insulation system can include a body of heated material at an elevated temperature. A layer of porous insulating material can be placed adjacent to and in fluid communication with the body of heated material. The insulating layer can contain distributed liquid water in an amount sufficient to cool the insulating layer through evaporative vapor flow toward the body of heated material. The amount of water can be sufficient to provide water vapor for inhibiting the diffusion and adsorption of hydrocarbons from the heated material. The insulating layer can include a continuous vapor phase. A heat sink material at a lower temperature can be placed adjacent to the insulating layer and opposite from the body of heated material.

17 Claims, 4 Drawing Sheets

(56) References Cited

U.S. PATENT DOCUMENTS

| | | | |
|---|---|---|---|
| 9,828,551 B2 * | 11/2017 | Patten | C10G 1/045 |
| 2005/0045306 A1 * | 3/2005 | Petervary | B64C 1/38 |
| | | | 165/80.3 |
| 2010/0200464 A1 | 8/2010 | Dana et al. | |
| 2011/0107789 A1 | 5/2011 | Sedlak et al. | |
| 2011/0138649 A1 | 6/2011 | Patten | |
| 2011/0308801 A1 | 12/2011 | Dana | |

* cited by examiner

THERMAL INSULATION SYSTEM USING EVAPORATIVE COOLING

RELATED APPLICATION

This application claims priority to U.S. Provisional Application No. 62/062,328 filed Oct. 10, 2014 entitled "Thermal Insulation System Using Evaporative Cooling," which is incorporated herein by reference.

FIELD OF THE INVENTION

The present invention relates to systems and methods for insulating heated materials, such as hydrocarbonaceous materials from which hydrocarbons are produced, while preventing holdup of hydrocarbons. Therefore, the invention relates to the fields of hydrocarbon production and heat transfer.

BACKGROUND

Many processes have been developed for producing hydrocarbons from various hydrocarbonaceous materials such as oil shale and tar sands. Historically, the dominant research and commercial processes include above-ground retorts and in-situ processes. More recently, encapsulated impoundments have been developed for recovering oil from crushed oil shale (In-Capsule® technology). These impoundments are formed primarily of earthen materials, with the crushed oil shale being encapsulated by an impermeable barrier made of rock, soil, clay, and geosynthetics, among other materials. The encapsulated impoundments can be very large, sometimes occupying several acres.

Generally, methods for recovering hydrocarbon products from oil shale involve applying heat to the oil shale. Heating oil shale allows kerogen in the oil shale to break down through the process of pyrolysis, yielding liquid and vapor hydrocarbon compounds. One issue in these processes is the loss of heat to surroundings. This "fugitive heat" has negative effects on the process because the heat lost is not useful for accomplishing the process objective of producing hydrocarbon products. Excessive fugitive heat can also heat the surrounding environment to temperatures that are unacceptable. One method of addressing this problem in above-ground retorts is installing insulation to maintain heat inside the retort. For in-situ processes such as the Shell Oil in-situ process, a freeze wall can be formed by using a refrigerant to cool edges of a production zone below the freezing temperature of water. These solutions can be costly and energy-intense. Accordingly, research continues to find efficient methods of recovering hydrocarbon products while minimizing fugitive heat.

SUMMARY

Systems for thermally insulating a body of heated material, such as heated oil shale, can include an insulating layer of porous insulating material adjacent to the heated material. The insulating layer can contain liquid water distributed in the porous insulating material. Heat from the body of heated material can cause the water to evaporate. Due to the high latent heat of vaporization of water, a large amount of heat can be absorbed by the evaporating water without raising the temperature of the insulating layer. Water vapor can flow from the insulating layer toward the body of heated material. The amount of water in the insulating layer can be sufficient so that the insulating layer also has a continuous flow of water vapor. The flow of water vapor from the insulating layer into the body of heated material can help keep the insulating layer cool, prevent escape of hydrocarbon vapors from the body of heated material, and prevent hydrocarbons from condensing on the porous insulating material to cause excessive holdup of hydrocarbons in the insulating layer.

A heat sink material can be adjacent to the insulating layer and opposite from the body of heated material. While the body of heated material is heated to a high temperature, the heat sink material can be maintained at a lower temperature by the insulating layer.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized, by conversion from a feedstock material, or otherwise removed from the material. Many hydrocarbonaceous materials contain kerogen or bitumen which is converted to a flowable or recoverable hydrocarbon through heating and pyrolysis. Hydrocarbonaceous materials can include, but are not limited to, oil shale, tar sands, coal, lignite, bitumen, peat, and other organic rich rock. Thus, existing hydrocarbon-containing materials can be upgraded and/or released from such feedstock through a chemical conversion into more useful hydrocarbon products.

As used herein, "spent hydrocarbonaceous material" and "spent oil shale" refer to materials that have already been used to produce hydrocarbons. Typically after producing hydrocarbons from a hydrocarbonaceous material, the remaining material is mostly mineral with the organic content largely removed.

As used herein, "lean hydrocarbonaceous material" and "lean oil shale" refer to materials that have a relatively low hydrocarbon content. As an example, lean oil shale can typically have from 1% to 8% hydrocarbon content by weight.

As used herein, "rich hydrocarbonaceous material" and "rich oil shale" refer to materials that have a relatively high hydrocarbon content. As an example, rich oil shale can typically have from 12% to 25% hydrocarbon content by weight, and some cases higher.

As used herein, "compacted earthen material" refers to particulate materials such as soil, sand, gravel, crushed rock, clay, spent shale, mixtures of these materials, and similar materials. A compacted earthen material suitable for use in the present invention typically has a particle size of less than about 10 cm in diameter.

As used herein, "heat sink material" refers to any material opposite a heated hydrocarbonaceous material across the insulating layer. The term "heat sink material" is not intended to be restricted to materials that are commonly used as heat sinks in other applications. Nor does the term imply that the heat sink material has properties associated with heat sinks in other applications, such as high thermal conductivity. In some embodiments of the present disclosure the heat sink material can be an earthen material such as soil or clay and can have a low permeability to gas.

As used herein, "temperature sensitive" refers to materials that would be adversely affected by high temperatures, such as the temperature of the body of heated material. For example, swelling clay can be substantially impermeable to liquids and vapors when hydrated, but temperatures above the boiling point of water can dehydrate the swelling clay and increase the permeability of the swelling clay.

As used herein, "saturated" refers to the maximum amount of water that can be retained in a particulate material without the water draining out of the material by gravitational force. The saturation amount can be a function of particle surface area, void space in the particulate matrix, void space dimensions, and composition of the particulate material, which can affect surface chemistry of the particulate material. In some cases, a saturation amount of water can be achieved by adding a greater than saturation amount of water to a particulate material and allowing the excess water to drain out, leaving a saturation amount of water in the particulate material. Alternatively, an amount of water needed to achieve saturation can be calculated for a given volume of material. The amount of water can then be applied to the particulate material to produce a saturated material. Particulate materials with a saturation amount of water generally have liquid water wetting surfaces of the particles with a vapor phase distributed in interstitial spaces between the wetted particles, although with small void space dimensions, capillary action may partially or completely fill a portion of interstitial spaces.

As used herein, "holdup" refers to hydrocarbon liquids that become trapped in the insulating layer so that the hydrocarbons cannot be easily removed. Holdup can decrease the economic efficiency of a hydrocarbon production process because the trapped hydrocarbons represent lost product. Liquid hydrocarbons can be adsorbed to surfaces of insulating material particles in the insulating layer, pooled in spaces between the particles, or otherwise trapped in the insulating layer.

As used herein, whenever any property is referred to that can have a distribution between differing values, such as a temperature distribution, particle size distribution, etc., the property being referred to represents an average of the distribution unless otherwise specified. Therefore, "particle size of the insulating material" refers to an average particle size, and "temperature of the body of heated material" refers to an average temperature of the body of heated material.

It is noted that, as used in this specification and in the appended claims, the singular forms "a," "an," and "the" include plural referents unless the context clearly dictates otherwise. Thus, for example, reference to "a layer" includes one or more of such features, reference to "a particle" includes reference to one or more of such elements, and reference to "producing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. Additionally, adjacent structures or elements can in some cases be separated by additional structures or elements between the adjacent structures or elements. As an example, a layer of heat sink material can be adjacent to an insulating layer although a thin layer of geosynthetic fabric is placed between the heat sink material and insulating layer. Alternatively, the geosynthetic fabric can be considered to be a part of the heat sink material layer, so that the heat sink material layer is in contact with the insulating layer.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following description should not be considered limiting.

Thermal Insulation Systems Using Evaporative Cooling

The present technology provides systems and methods for insulating a body of heated material. The technology takes advantage of the high latent heat of vaporization of water to help cool an insulating layer around the body of heated material. In processes for extracting hydrocarbons from hydrocarbonaceous material such as oil shale, these systems and methods can solve several problems. First, water present in the insulating layer can absorb a large amount of heat from the heated material as the water evaporates. This allows the insulating layer to effectively protect surrounding materials from the heat of the body of heated material. Because the evaporating water absorbs a larger amount of heat than the insulating layer would when dry, thickness of the insulating layer can be reduced, thus reducing the cost of the system.

Additionally, a thick insulating layer can cause greater holdup of hydrocarbons produced from the hydrocarbonaceous material. Hydrocarbon vapors can condense in the insulating layer and become adsorbed to the insulating material or otherwise trapped in the insulating material. Even though the progressive heat wave will re-evaporate light hydrocarbons, heavy hydrocarbons may remain trapped at the end of the heating cycle. Hydrocarbons thus trapped are typically not recovered, and therefore represent lost revenue. The problem of holdup is especially pronounced when the insulating material has a high surface area or small-size void spaces that can easily trap hydrocarbon liquids. By using the present technology, the thickness of the insulating layer can be reduced, reducing the amount of porous insulating material in which hydrocarbons may become trapped.

Wetting the insulating material with water also reduces hydrocarbon condensation and adsorption in the insulating layer. Hydrocarbons are not typically adsorbed on insulation particles that are covered by a layer of water. Insulation particles comprised of minerals generally prefer to be wetted by water, rather than by hydrocarbons. As the hydrocarbon recovery process proceeds, interior portions of the insulating layer can become dehydrated as water evaporates. Hydrocarbons can then potentially condense on dry insulating material along the interior portions of the insulating layer. However, water vapor flowing from deeper in the insulating layer toward the heated material can limit diffusion of hydrocarbon vapors into the insulating layer and also strip any adsorbed hydrocarbons off of the insulating material. The forced flow created by the evaporating water is counter in direction to the diffusion path of the hydrocarbons, sweeping hydrocarbons from the insulating material back to the heated material, where they are recovered. Configuring the insulating layer in accordance with the present technology can provide a consistent flow of water vapor from the insulating layer into the body of heated material during recovery of hydrocarbons. Therefore, the amount of hydrocarbon vapors entering the insulating layer and condensing on the insulating material can be greatly reduced, if not eliminated.

In encapsulated hydrocarbon production processes, the insulating layer can surround a body of heated hydrocarbonaceous material, and the insulating layer can in turn be encapsulated by an impermeable heat sink material. One purpose of the encapsulation is to prevent escape of hydrocarbon vapors from the encapsulated impoundment. Configuring the insulating layer to provide a consistent or constant flow of water vapor into the body of heated hydrocarbonaceous material counter-flow to hydrocarbon vapors diffusing through the insulating layer to the impermeable layer reduces the opportunity for holdup and helps eliminate chances of hydrocarbons escaping from the impoundment.

The present technology can be especially useful in applications with a finite heating time. For example, in encapsulated hydrocarbon production, a body of hydrocarbonaceous material can be heated for a finite period of time until a desired amount of hydrocarbons have been recovered. In this situation, the thickness of the insulating layer and the amount of water in the insulating layer can be calculated so that at least some liquid water will remain in the insulating layer until the end of the heating time, so that a constant or at least consistent flow of water vapor can be maintained throughout operation of the process. At a minimum, the amount of water can be calculated to be exhausted just as recovery is completed. Thus, the system and method of the present invention provides a timed mechanism to insulate materials during a heating process.

Figure 1:
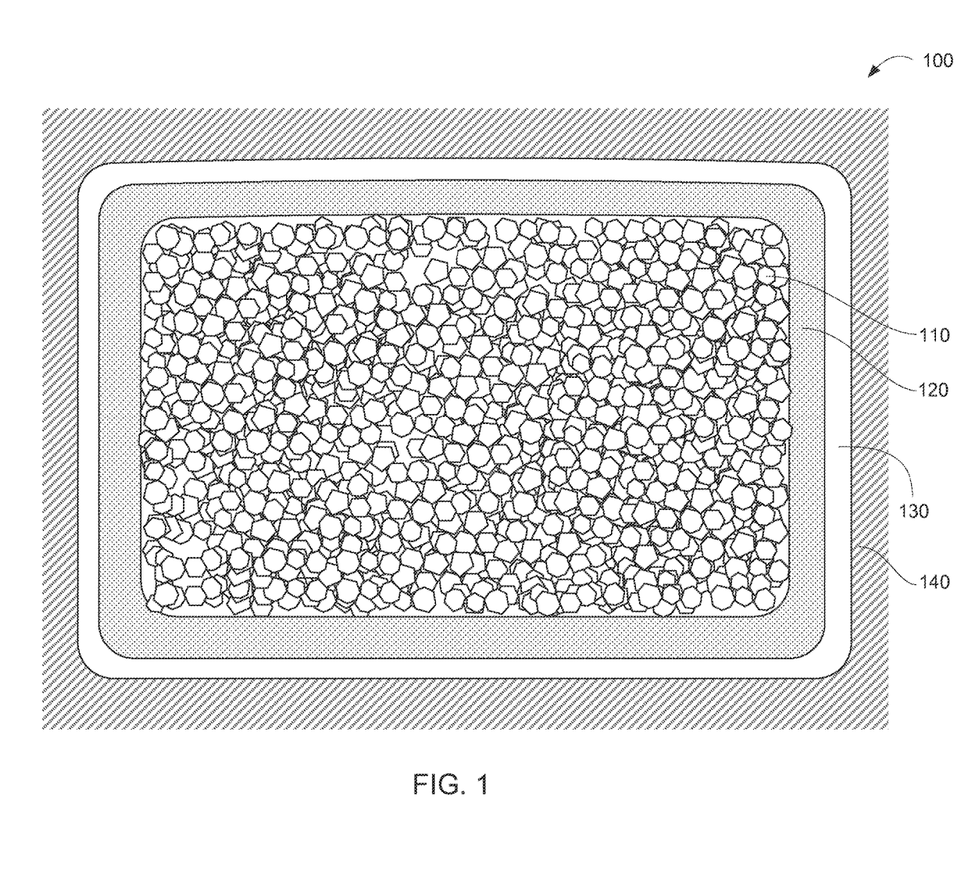
FIG. 1 is a cross-section illustration of a thermal insulation system in accordance with an embodiment of the present invention.

With the above benefits of the present technology in mind, FIG. 1 illustrates a thermal insulation system 100 in accordance with an embodiment of the present technology. A body of heated material 110 is at a first temperature. An insulating layer 120 is adjacent to the body of heated material. Typically, the insulating layer can encompass the heated material forming an insulating envelope about the heated material. This insulating layer can comprise a porous insulating material with a distributed liquid water throughout. The distributed liquid water can be present in an amount sufficient to cool the insulating layer through evaporative vapor flow toward the body of heated material during a heating time of the heated material. The insulating layer can also include a continuous vapor phase. A heat sink material 130 can be adjacent to the insulating layer and opposite from the body of heated material. In one aspect, the heat sink material can encompass the insulating layer to form a heat sink envelope about the insulating layer and heated material. The heat sink material can be maintained at a second temperature lower than the first temperature. The first temperature can generally be an operating range associated with hydrocarbon recovery for a particular material as discussed in more detail below. Additional wall material 140 can be adjacent to the heat sink material.

Figure 2:
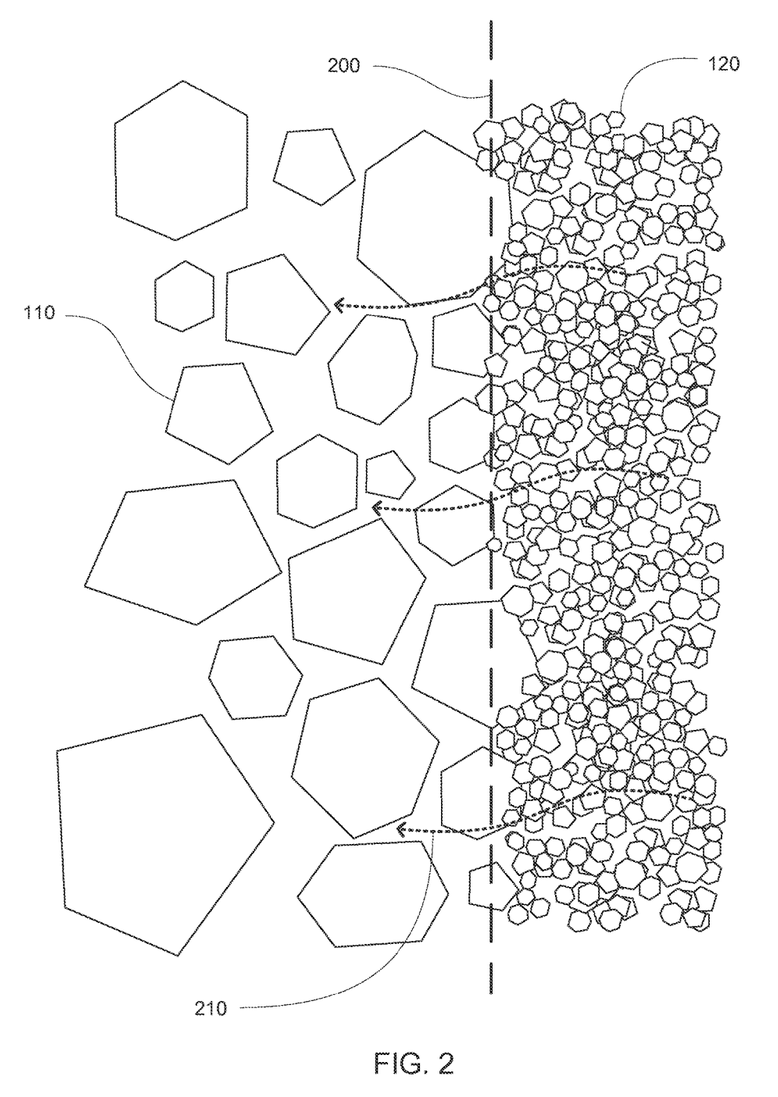
FIG. 2 is a close-up view of an interface between a body of heated material and an insulating layer in accordance with an embodiment of the present invention.

FIG. 2 shows an expanded view of an interface 200 between the body of insulated material 110 and the insulating layer 120. It should be noted that only a small portion of the body of heated material and the insulating layer are depicted. The body of heated material and the insulating layer both extend farther in the horizontal and vertical directions, although this is not shown. The interface is represented by a dashed line, which corresponds to a plane that roughly separates the body of heated material from the insulating material. As shown in the figure, a small amount of mixing can occur at the interface as particles of insulating material settle between particles of heated material. As the insulating layer is heated, water within this layer absorbs heat which eventually evaporates a portion of liquid water. The resulting water vapor expands such that evaporative flow currents 210 flow from the insulating layer into the body of heated material. Water vapor production within the void space can result in a volumetric exchange of gas from about 50 to 100 times for each 1% of water by weight, before temperatures reach pyrolysis temperatures.

Figure 3:
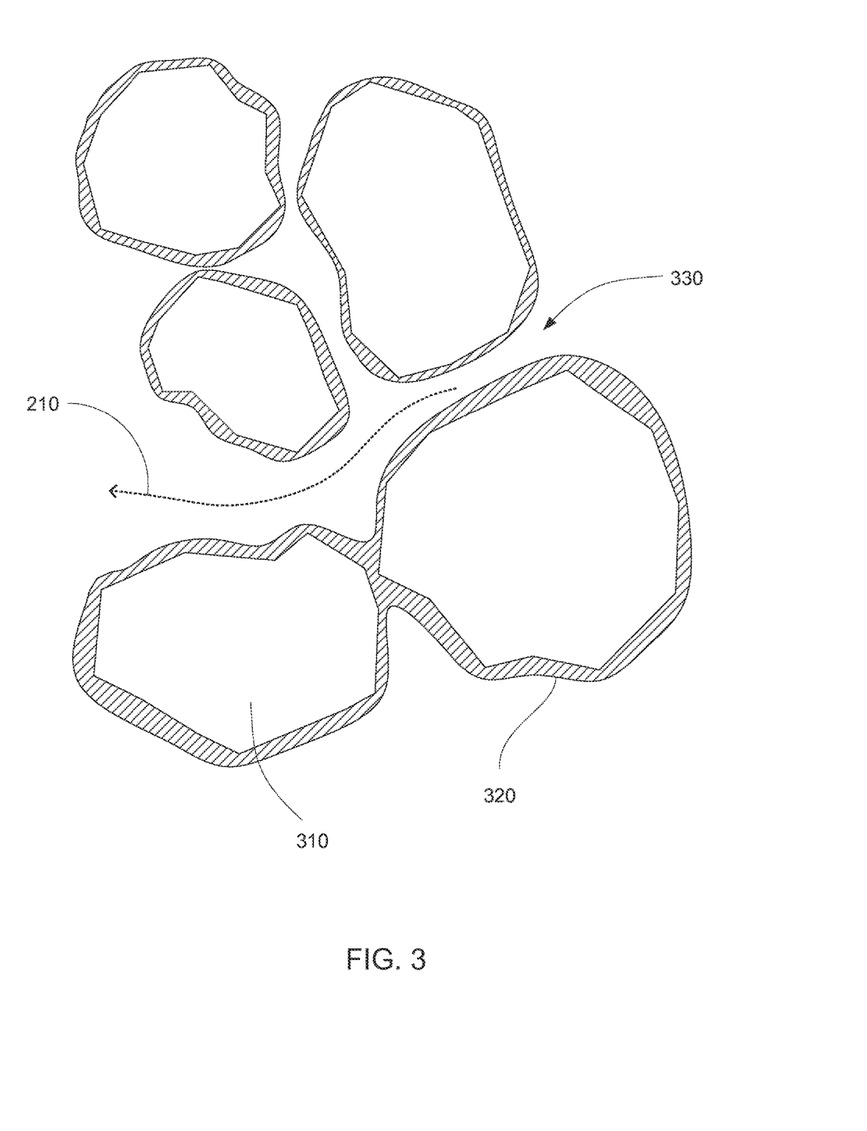
FIG. 3 is a close-up view of particles of insulating material in accordance with an embodiment of the present invention.

FIG. 3 shows a close-up view of particles of insulating material 310 within the insulating layer in accordance with an embodiment of the present invention. The particles can be wetted with liquid water 320. The wetting layer can form an envelope around particles having a film thickness which leaves void space between at least some adjacent particles to form a vapor phase, which may be continuous in some cases. The continuous vapor phase 330 can be present in interstitial spaces between the wetted particles. Although in some cases the continuous vapor phase can be present throughout the insulating layer, in other cases the continuous vapor phase can be present merely in regions adjacent the heated material sufficient to allow vapor flow from the insulating layer into the heated material. Evaporative flow currents 210 can flow through the interstitial spaces. Although specific thicknesses can vary based on operating conditions, the wetting layer can often have a thickness from about 0.4 mm to about 2.5 mm.

The heat sink material can be any material that is placed on the opposite side of the insulating layer from the body of heated material. In some embodiments, heat sink material can substantially encapsulate the body of heated material and the insulating layer, forming an insulating envelope about the heated material. The heat sink material can be impermeable to fluids including vapors, gases, and liquids. Non-limiting examples of suitable heat sink materials for use in forming the impoundment can include clay, bentonite clay (e.g. clay comprising at least a portion of bentonite which includes montmorillonite), compacted fill, refractory cement, cement, grout, high temperature asphalt, sheet steel, sheet aluminum, synthetic geogrids, fiberglass, rebar, hydrocarbon additives, filled geotextile bags, polymeric resins, PVC liners, or combinations thereof. For large scale operations forming the impoundment at least partially of earthen material can provide an effective barrier.

In certain embodiments, the heat sink material can comprise a swelling clay. Examples of swelling clay include, but are not limited to, bentonite clay, montmorillonite, kaolinite, illite, chlorite, vermiculite, etc. Most often, the heat sink material can be soil amended with a swelling clay. For example, the heat sink material can be bentonite amended soil. Bentonite amended soil can be hydrated by adding water, which causes the particles of bentonite to swell. The hydrated bentonite particles and the other particles present in the soil form an impermeable matrix that is an effective barrier to vapors and liquids. In some cases, bentonite amended soil can comprise, by weight, about 5-20% bentonite clay; 15-20% water; and the remainder soil or aggregate. When hydrated, the bentonite component swells to several times the dry volume of the bentonite clay thus sealing the soil such that this material is plastic and malleable.

The heat sink material can form an impoundment to restrict passage of fluids into or out of the impoundment. As such, hydrocarbon fluids produced from hydrocarbonaceous material inside the impoundment can be retained inside the impoundment to avoid contamination of the environment outside the impoundment and loss of valuable hydrocarbon products. Thus, the heat sink material can be free of a continuous vapor phase and is formed of packed solid particulate material within a continuous liquid phase. In some embodiments, the impoundment can prevent substantially all passage of hydrocarbons outside the impoundment except through designated conduits such as gas and liquid hydrocarbon outlet conduits. Such outlet conduits can include one or more drains in a lower portion of the impoundment which allow draining liquid hydrocarbons, one or more gas outlets in an upper portion of the impoundment for withdrawing gases and vapors, one or more intermediate outlets located at intermediate heights within the body of heated material for withdrawing hydrocarbon liquids and gases with various boiling points, or combinations of these different outlets. Outlet conduits can penetrate through the impermeable heat sink material layer to allow hydrocarbon products to be collected from the impoundment. The area of the heat sink material layer immediately surrounding the conduit can be sealed against the exterior surfaces of the conduit so that no leakage of hydrocarbons occurs at the interface between the conduit and the heat sink material.

Additionally, the impoundment can restrict passage of air, water, or other fluids into the impoundment from the surrounding environment. Leakage of air into the impoundment can potentially cause problems with the process of recovering hydrocarbons from hydrocarbonaceous materials. For example, the presence of oxygen can result in polymerization and agglomeration of the hydrocarbons and other contents within the impoundment. Further, the presence of oxygen can induce undesirable combustion within the system. In some embodiments, the impoundment can prevent substantially all passage of fluids into the impoundment from the surrounding environment. Optionally, fluids can be fed into the impoundment through designated inlet conduits. In some cases inlet conduits can be used to introduce heated gases into the impoundment to heat the body of hydrocarbonaceous material. In one such example, heating conduits can be used to introduce hot combustion gas into the impoundment. Other fluids that can be introduced into the impoundment through inlet conduits include, but are not limited to, steam, inert or non-oxidizing gases, solvents, hydrocarbons, catalysts, and so on. Accordingly, the impoundment can prevent passage of fluids in either direction, either into or out of the impoundment, with the exception of designated inlet and outlet conduits.

Although the heat sink material can be formed of a variety of materials, in one aspect, the heat sink material can be formed of a particulate material with an average diameter of 0.1 cm to about 5 cm, and most often from about 0.2 cm to about 1 cm. Similarly, the particulate material can have a range of sizes from about 74 micrometers (200 mesh) to about 10 cm (⅜"). The heat sink material can have a thickness sufficient to prevent leakage of fluids into or out of the impoundment. In one example, the heat sink material layer can have a thickness from about 10 cm to about 2 m. In another example, the heat sink material layer can have a thickness from about 50 cm to about 1 m.

Walls of the impoundment can additionally include support material. In some embodiments, the heat sink material can be supported by an outer wall formed from earthen material. The outer walls can include tailings berms, compacted earth, undisturbed geological formation, gabions, geosynthetic fabric, and other supporting material. In one embodiment, the impoundment can be formed as a free standing structure, i.e. using existing grade as a floor with side walls being man-made. Alternatively, the impoundment can be formed within an excavated pit by forming the layer of heat sink material against undisturbed formation surfaces of the excavated pit.

The heat sink material can also be temperature sensitive to high temperatures. The temperature sensitivity can be due to a property of the heat sink material that causes the heat sink material to become more permeable to gases or liquids at high temperatures. The particular temperature to which the heat sink material is sensitive can depend on the type of material and the property of the material that allows the material to be impermeable. For example, in some embodiments the heat sink material can comprise a clay that is hydrated with water. The clay swells when hydrated, which in turn makes the heat sink material impermeable to fluids. Accordingly, the heat sink material can become more permeable if the clay becomes dehydrated. Specifically, dehydrated clay particles can shrink, leaving cracks or spaces between particles through which fluids can flow. Dehydration can occur if the heat sink material is exposed to temperatures that cause water in the heat sink material to evaporate. Therefore, the heat sink material can be temperature sensitive to such temperatures. In some embodiments, the heat sink material can be temperature sensitive to temperatures greater than the boiling point of water (>100° C.), about equal to the boiling point of water (about 100° C.), or greater than about 10° C. below the boiling point of water (>90° C.). It should also be noted that if elevated pressure is used in the impoundment then the boiling point of water in the heat sink material can be elevated as well. Conversely, if the location of the impoundment is at elevations significantly higher than sea level, the boiling point of water is correspondingly reduced. So long as the insulating material is hydrated, there remains 100% humidity at the boundary between the insulating material and the heat sink material and the heat sink material is prevented from drying out, even at temperatures approaching (but not exceeding) the boiling point of water at the prevailing pressure.

In further embodiments the heat sink material can be sensitive to other temperatures. In some cases, additives can be added to a heat sink material containing swelling clay to modify the temperature at which the swelling clay will dehydrate. For example, additional liquids with a higher or lower boiling point than water can be added to raise or lower the temperature at which the swelling clay will dehydrate. Non-limiting examples of such material can include glycerin. In other examples, the heat sink material can comprise another material that degrades at a certain temperature, such as polymers that melt at a desired melting point.

The body of heated material within the impoundment can be at a temperature to which the heat sink material is temperature sensitive. For example, in some embodiments the body of heated material can be at a temperature from about 95° C. to about 500° C. These temperatures can be sufficient to dehydrate swelling clay in the heat sink material. Therefore, the heat sink material can be maintained below the temperature to which the heat sink material is temperature sensitive. In one embodiment, the body of heated material can be at from 95° C. to 500° C. and the heat sink material can be at from 0° C. to 95° C. In another embodiment, the body of heated material can be at from 100° C. to 400° C. and the heat sink material can be at from 0° C. to 95° C. In yet another embodiment, the body of heated material can be at from 200° C. to 300° C. and the heat sink material can be at from 0° C. to 95° C. Generally, the body of heated material can be at a first temperature and the heat sink material can be at a second temperature, wherein the second temperature is lower than the first temperature and wherein the heat sink material is temperature sensitive to the first temperature. In a specific embodiment, the first temperature can be above the boiling point of water and the second temperature can be below the boiling point of water.

In some examples, the heated material can be a hydrocarbonaceous material. Examples of hydrocarbonaceous material include, but are not limited to, oil shale, tar sands, lignite, bitumen, coal, peat, harvested biomass, and any other hydrocarbon-rich material. Many of these materials are characterized by the ability to produce liquid and gaseous hydrocarbons by heating the materials to elevated temperatures. For example, oil shale can be heated to temperatures sufficient to pyrolyze kerogen in the oil shale, which breaks down the kerogen into liquid and gaseous hydrocarbons with lower molecular weights. The operating temperature for producing hydrocarbons can be selected depending on the type of hydrocarbonaceous material, the desired molecular weight of hydrocarbon products, the desired phase (liquid or vapor) of hydrocarbon products, and the desired rate of production of hydrocarbon products. For example, lower temperatures can be applied for longer periods of time, or higher temperatures can be applied for shorter periods of time. In some embodiments, the temperature of hydrocarbon production can be from about 95° C. to about 550° C., and in other aspects from 330° C. to 400° C.

Referring again to FIG. 1, the insulating layer 120 can be formed between the body of heated material 110 and the heat sink material 130. The insulating layer can be sufficient to maintain the body of heated material at a first temperature and the heat sink material at a second temperature. As explained above, the first and second temperatures can be such that the heat sink material is temperature sensitive to the first temperature, but the heat sink material is maintained at a second temperature at which the heat sink material is not temperature sensitive. The insulating layer can comprise particles of insulating material that are wetted with liquid water. As shown in FIG. 3, the liquid water 320 can coat surfaces of the particles 310 and leave a continuous vapor phase 330 in interstitial spaces between the wetted particles.

In some embodiments, the insulating layer can substantially surround the body of heated material so that the body of heated material is encapsulated by the insulating layer. The insulating layer can, in turn, be encapsulated by the heat sink material layer. As explained above with respect to the heat sink material layer, the insulating layer can be penetrated by conduits, such as inlet, outlet, and heating conduits.

The insulating layer can comprise a variety of insulating materials. The insulating material can generally be a material that does not trap or otherwise inhibit fluid flow through the insulating layer. Examples of insulating materials include, but are not limited to, gravel, sand, spent oil shale, open-cell foam, fiberglass, mineral wool, and so on. In one embodiment, the insulating material can be crushed spent oil shale. Other optional insulation materials can include biodegradable insulating materials, e.g. soy insulation and the like. This is consistent with embodiments wherein the impoundment is a single use system such that insulations and other components can have a relatively low useful life, e.g. less than 1-2 years. This can also reduce equipment costs as well as reduce long-term environmental impact.

The insulating material can be porous. In some cases, the insulating material can be a particulate material that is loosely formed into an insulating layer so that spaces remain between the particles. In such embodiments, the porosity of the material can be provided by the spaces between the particles although the particles themselves may not be particularly porous. In other cases, individual particles of insulating material can contain microscopic or visible pores so that the particles themselves are porous. In such embodiments, the porosity of the material can be provided both by the spaces between the particles and by the pores contained in the particles. In one example, the insulating material can be spent oil shale. Particles of spent oil shale can contain many small pores where kerogen has been converted into smaller hydrocarbons and removed. In some embodiments, the particles of insulating material can have a porosity from about 0.1 to about 0.5. In other embodiments, the porosity can be from about 0.15 to about 0.3. In further embodiments, the insulating layer can have a void space, referring to space between particles, from about 20% to about 50%. In still further embodiments, the void space can be from about 25% to about 40%.

In some embodiments, the insulating material can be a particulate earthen material. For example, the insulating material can be crushed spent oil shale, crushed lean oil shale, or other crushed rock. In one example, the insulating material can be a particulate earthen material having a particle size from about 1 mm to about 5 cm. In another example, the particle size can be from about 1 mm to about 2 cm. In a specific embodiment, the insulating material can be crushed spent or lean oil shale with an average particle size of about 1 mm to about 2 cm.

In hydrocarbon production processes, insulating material can be obtained from materials produced as part of the process. For example, hydrocarbonaceous materials can be mined to use as a feedstock for hydrocarbon production. After producing hydrocarbons from the hydrocarbonaceous material, the spent hydrocarbonaceous material can be crushed and used as insulating material. Additionally, other rock that may be mined along with the hydrocarbonaceous material can be used as the insulating material, or lean hydrocarbonaceous material that would not be profitable to use as feedstock can be used as insulating material.

The insulating material can be wetted with water. The amount of water contained in the insulating material can vary. In one embodiment, the insulating material can be initially saturated with water, meaning that any additional water would run through the insulating layer under the force of gravity and either run out of the insulating layer at the bottom or pool at the bottom. In other embodiments, the insulating material can contain less than a saturation amount of water. The amount of water added can also depend on the surface area of the insulating material, void volume of the insulating material, interparticle dimensions, temperature of the body of heated material, and the length of the heating time. Insulating materials with a small particle size, irregular particle shape, or high particle porosity can have larger surface areas per volume of the insulating material. Such insulating materials can retain a greater amount of water wetted on the surfaces of the particles. In one example, the insulating material can contain from about 1% to about 20% water by weight. In another example, the insulating material can contain from about 5% to about 15% water by weight, and in a further example the insulating material can contain from about 8% to about 12% water by weight. The insulating material can be wetted with water before forming the insulating layer from the insulating material, or the insulating layer can be formed from dry insulating material and then water can be added afterward.

When the body of heated material is at a higher temperature than the insulating layer, thermal energy is transferred from the body of heated material to the insulating layer. As this heat transfer occurs, the water in the insulating layer can begin to evaporate. Because water has a high latent heat of vaporization, the evaporation can absorb large amounts of heat from the body of heated material and maintain the temperature of the insulating layer below the boiling point of water. The evaporating water can form a vapor phase between the particles of insulating material which progressively retreats during heating as water is vaporized along inner fronts of the liquid phase relative to the heated material. In some embodiments, the insulating material can have a sufficient amount of void space between particles so that the particles can be coated with water while maintaining a continuous vapor phase between the wetted particles. In a particular embodiment, the continuous vapor phase can occupy from 20% to 50% of the insulating layer by volume at an initial time and in regions behind the retreating front of the liquid phase during heating. In another embodiment, the continuous vapor phase can occupy from 30% to 40% of the insulating layer by volume. The volume of the vapor phase is generally controlled by particle size distribution, composition of the insulating material (which affects the surface chemistry of the material and consequently the amount of water wetting the material), and methods of preparing the insulating layer such as blending, layering and compacting.

The insulating layer can be characterized by a high hydraulic conductivity. Hydraulic conductivity refers to the ease with which a fluid can move through a porous medium. Although hydraulic conductivity is often used to describe movement of liquid water through soil or rock, a high hydraulic conductivity can also be useful for allowing water vapor to flow through the insulating layer of the present disclosure. Generally, gravel and sand have hydraulic conductivities ranging from 0.01 cm/s to 100 cm/s. Accordingly, in one embodiment the insulating layer can have a hydraulic conductivity greater than about 0.01 cm/s. In another embodiment, the insulating layer can have a hydraulic conductivity greater than about 1 cm/s. In yet another embodiment, the insulating layer can have a hydraulic conductivity greater than about 10 cm/s.

The evaporation of water in the insulating layer can create a current of water vapor flowing from the insulating layer into the body of heated material. This results from the expansion of water vapor as it evaporates. The insulating layer is bounded on one side by the impermeable heat sink material, so that when the water vapor expands it naturally flows away from the heat sink material and into the body of heated material. To the partial pressure within the body of heated material can be lower than the vapor pressure of water at the temperature of the body of heated material. In one embodiment, the body of heated material can be at slightly lower than standard atmospheric pressure, such as from about 0.75 to about 1 atm absolute pressure. In other embodiments, the pressure in the body of heated material can be higher than atmospheric pressure, such as from about 1 atm to about 5 atm absolute pressure, and in most cases from about 1 atm to about 1.5 atm. At higher temperatures, the vapor pressure of water can be greater than the elevated pressure within the body of heated material. Thus, evaporating water from the insulating layer provides a continuous current of water vapor flowing toward the body of heated material. The current of water vapor can prevent hydrocarbon vapors from diffusing into the insulating layer, reduce the partial pressure of hydrocarbons in the pores, flush out hydrocarbon vapors that may have already entered the insulating layer, and strip away hydrocarbons that may have condensed on the insulating material. This can reduce, and in some cases eliminate, the amount of hydrocarbon holdup within the insulating layer.

In some embodiments, the insulating layer can be designed to substantially eliminate holdup of hydrocarbons in the insulating layer. That is, after hydrocarbons have been extracted from the body of heated material and the production process is complete, there can be substantially no liquid hydrocarbons present in the insulating layer. In other embodiments, the insulating layer can be designed to have a reduced holdup. For instance, the holdup of hydrocarbons in the insulating layer can be less than the holdup would have been if the insulating material had not been wetted with water. In some cases, the insulating layer can retain a holdup of less than 0.1%, less than 2%, or less than 5% hydrocarbons by weight in the insulating layer.

Generally, the insulating layer can provide a temperature gradient sufficient to maintain the body of heated material at a first temperature and the heat sink material at a second temperature. In some cases, the temperature gradient across the insulating layer can be greater than 20° C., greater than 100° C., greater than 200° C., greater than 300° C., or greater than 400° C. In practice, the temperature of the insulating layer can be maintained at or below the boiling point of water while the insulating material is wet. As water evaporates from the insulating material, the insulating material can dry out and then increase in temperature. The insulating material nearest to the body of heated material can dry out first, and then a dry zone can extend over time across the insulating layer. The temperature gradient can be steepest in the dry zone of the insulating layer, while the wet insulating material remains at or below the boiling point of water. If the insulating layer dries out completely, the insulating layer can still retain some insulating ability. However, if the insulating layer is not sufficiently thick to insulate the heat sink material while the insulating layer is dry, then the heat sink material may begin to heat up above the boiling point of water or respective dehydration temperature if additives are used.

To prevent degradation of the heat sink material, the insulating layer can be designed with a thickness that allows for maintaining the heat sink material at a sufficiently low temperature throughout a heating time of the body of heated material. The thickness can depend on the heat flux from the body of heated material, the heating time, the heat capacity of the insulating material, and the amount of water in the insulating layer. The insulating layer can be at least thick enough so that the total amount of heat transferred from the body of heated material to the insulating layer is absorbed by the evaporation of the water and the heat capacity of the insulating material. In one embodiment, the thickness can be great enough so that at least some water remains in the insulating layer at the end of the heating time. In one particular embodiment, the thickness can be selected so that at least 60% of the amount of water in the insulating layer evaporates by the end of the finite heating time. In another embodiment, the thickness can be selected so that substantially all the water in the insulating layer evaporates, but the second temperature is less than the first temperature throughout the finite heating time. It is to be understood that the thickness of the insulating layer can vary depending on the overall size of the impoundment and the body of heated material, as well as the temperatures and heating times involved. However, in some examples the insulating layer can have a thickness from about 0.5 m to about 10 m. In other examples, the insulating layer can have a thickness of about 0.8 m to about 4 m.

The heating time can be relatively long. For example, in some examples the heating time can be from about 3 days to about 2 years. In other examples, the heating time can be from about 3 months to about 1 year. In embodiments involving production of hydrocarbons from hydrocarbonaceous material, the heating time can be sufficient to recover most of the hydrocarbons from the hydrocarbonaceous material. In one example, the heating time can be sufficient to recover at least 99% of the convertible hydrocarbons from the hydrocarbonaceous material. Long heating times used in conjunction with moderate temperatures can in some cases produce better quality hydrocarbon products than shorter heating times with higher temperatures.

The size of the impoundment can also be relatively large. Larger impoundments or systems with multiple impoundments can readily produce hydrocarbon products and performance comparable to or exceeding smaller impoundments. As an illustration, single impoundments can range in size from 15 meters across to 200 meters, and often from about 100 to 160 meters across. Optimal impoundment sizes may vary depending on the hydrocarbonaceous material and operating parameters, however suitable impoundment areas can often range from about one-half to ten acres in top plan surface area. Additionally, the impoundment can have a depth from about 10 m to about 50 m.

Figure 4:
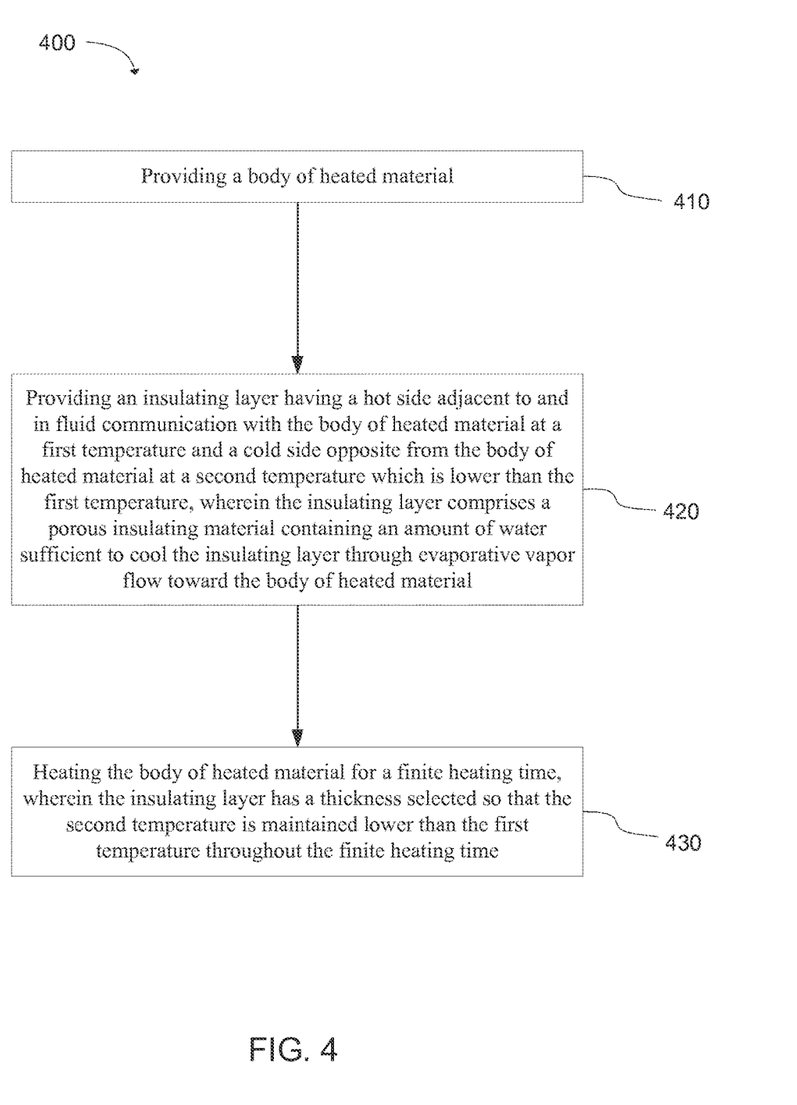
FIG. 4 is a flowchart illustrating a method of insulating a body of heated material in accordance with an embodiment of the present invention.

The present technology also includes a method of insulating a body of heated material. FIG. 4 is a flowchart illustrating such a method 400. A body of heated material can be provided 410. An insulating layer can be provided with a hot side adjacent to and in fluid communication with the body of heated material 420. The body of heated material and the hot side of the insulating layer can be at a first temperature. Opposite from the body of heated material, a cold side of the insulating layer can be at a second temperature which is lower than the first temperature. The insulating layer can include a porous insulating material containing an amount of water sufficient to cool the insulating layer through evaporative vapor flow toward the body of heated material. The method can further include heating the body of heated material for a finite heating time 430. The thickness of the insulating layer can be selected so that the second temperature is maintained lower than the first temperature throughout the finite heating time.

In some embodiments, the method can include forming an impermeable layer on the cold side of the insulating layer. The impermeable layer can include any of the heat sink materials discussed above. In one embodiment, the impermeable layer can comprise a hydrated swelling clay. In a specific embodiment, the impermeable layer can comprise a hydrated clay selected from the group consisting of bentonite, montmorillonite, kaolinite, illite, chlorite, vermiculite, and mixtures thereof.

Additional wall material can also be added to form walls outside the impermeable layer. As discussed above, the outer walls can include tailings berms, compacted earth, undisturbed geological formation, gabions, geosynthetic fabric, and other supporting material. Alternatively, the method can include digging a pit into existing formation, and the exposed formation on the sides of the pit can support the impoundment. The impermeable layer can be formed directly against the exposed formation.

The body of heated material, insulating layer, impermeable layer, and outer walls can be formed with any of the compositions and dimensions as discussed above. The impoundment can be formed using any suitable approach. However, in one aspect, the impoundment is formed from the floor up. The formation of the wall or walls and filling of the enclosure with the body of heated material can be accomplished simultaneously in a vertical deposition process where materials are deposited in a predetermined pattern. For example, multiple chutes or other particulate delivery mechanisms can be oriented along corresponding locations above the deposited material. By selectively controlling the volume of particulate delivered and the location along the aerial view of the system where each respective particulate material is delivered, the layers and structure can be formed simultaneously from the floor to the ceiling. The sidewall portions of the infrastructure can be formed as a continuous upward extension at the outer perimeter of the floor and each layer present, including the body of heated material, the insulating layer, the impermeable layer, and optionally outer walls formed of compacted earthen material, are constructed as a continuous extension of the floor counterparts. During the building up of the sidewalls, the body of heated material can be simultaneously placed on the floor and within the sidewall perimeter such that, what will become the enclosed space, is being filled simultaneously with the rising of the constructed sidewall. In this manner, internal retaining walls or other lateral restraining considerations can be avoided. This approach can also be monitored during vertical build-up in order to verify that intermixing at interfaces of layers is within acceptable predetermined tolerances (e.g. maintain functionality of the respective layer). For example, excessive intermingling of the heat sink material in the impermeable layer with the insulating material in the insulating layer may compromise the sealing function of the impermeable layer. This can be avoided by careful deposition of each adjacent layer as it is built up and/or by increasing deposited layer thickness. Hydrated materials in the impermeable layer can be deposited dry and then hydrated after the impoundment is complete. Alternately, a first horizontal layer of dry material can be deposited, followed by hydrating the layer, and then another layer of dry material can be deposited on top of the first layer, and then hydrated, and so on. Similarly, the insulating layer can be deposited dry and then wetted with water after the impoundment is complete. Alternatively, the insulating material can be wetted with water before deposition.

The method of insulating the body of heated material can further comprise producing hydrocarbons from the body of heated material. As discussed above, the body of heated material can be a hydrocarbonaceous material. Hydrocarbon products can be produced from the hydrocarbonaceous material by heating the hydrocarbonaceous material and withdrawing products through outlet conduits.

All aspects of the thermal insulation system discussed above can also be applied to the method of insulating the body of heated material, and vice versa.

EXAMPLES

A particulate dry mineral material has a specific heat on the order of 0.25 Btu/lb-° F. The specific heat of water is approximately 1.0 Btu/lb-° F. over a range of temperatures, and the latent heat of vaporization of water is 970 Btu/lb (at the boiling point). Thus, heating the dry material from 70° F. to 200° F., a difference of 130 degrees, only requires 32.5 Btu/lb (130×0.25), whereas heating and boiling water requires 1100 Btu/lb (130×1.0+970). If the material is wetted with water to the extent of 10% by weight, the heat required to raise the temperature to 200° F. and dry the material is 139.25 Btu/lb (0.9×130×0.25+0.1×1100). Thus, the heat required to raise the temperature of the wet material (10% water) to the boiling point of water and to evaporate the water is more than 4 times that of the dry material. This results in a significant improvement in insulating capacity when the heat source is of a finite duration and amount.

For the example cited above, a dry insulating layer 12 ft thick and 3 feet by 3 feet cross-sectional area occupies 108 cubic feet. At a true density of 150 lb/ft$^3$, and a void fraction of 30%, the resultant bulk density is 105 lb/ft3, for a total mass of 11,340 lb (108 ft$^3$×105 lb/ft$^3$). For the case in which the inside wall of the insulation reaches a first temperature of 700° F., and the outside wall, adjacent to the heat sink material, reaches a second temperature of 200° F., and the average temperature of the insulating material is 450° F. (in practice the average temperature can be somewhat less than 450° F., but for illustration purposes a linear temperature distribution can be assumed across the insulating bed), and ignoring the heat capacity of vapors in the void space, the total quantity of heat delivered to this portion of insulation can be calculated as follows:

(450−200) F×0.25 Btu/lb-F×11340 lb=1,077,300 Btu.

As a comparison, instead of dry insulation, a similar calculation can be made using wet insulation containing 10% water. The wet insulation now has a mass of 115.5 lb/ft$^3$; 105 lb/ft$^3$ of which is dry material and 10.5 lb/ft$^3$ is water. Assume that the bed heat-up rate is identical and that the total heat flux to the insulating layer is identical, namely 1,077,300 Btu for that 3' by 3' cross-sectional area. Assume also that the final condition of the insulating layer is the same. Namely, the inside temperature is the first temperature of 700° F. and the outside temperature is the second temperature of 200° F., or the point at which essentially all of the evaporative cooling of the water has been utilized. Assume also, for purposes of illustration, that the average temperature of the insulating layer is 450° F. In practice, the actual average will be higher than 450° F. because the temperature profile across the length of the insulating layer is far from linear, but any approximation made by using an average of 450° F. is conservative.

The heat required to raise a cubic foot of wet insulation from ambient to 200° F. can be calculated. For the rock component (200−70)*0.25*105=3412.5 BTU/ft3, and for the water component (200−70)*1.0*10.5=1365 BTU/ft$^3$-insulation. The heat required to evaporate the 10.5 water from the cubic foot can be calculated as 970 Btu/lb×10.5 lb=10185 BTU/ft$^3$-insulation.

The heat required to raise the temperature of the dry rock from 200 to 450° F. (the average temperature) can be calculated as (450−200)*0.25*105=6562.5 BTU/ft$^3$-insulation. As in the illustration above for the dry rock, the heat required to raise the temperature of the vapors found in the voids is ignored as being small, if not negligible, and not substantially different between the two cases.

The total heat required to raise wet insulation from 70° F. to 450° F., while simultaneously evaporating the water contained therein can be calculated as:

$$3412.5+1365+10185+6562.5=21528 \text{ BTU/ft}^3\text{-insulation.}$$

Thus, to absorb 1,077,300 BTU of heat a total of 50 ft$^3$ of wet insulation is needed (i.e. 1,077,300/21,528=50). For the cross section of 3×3 ft, or 9 feet, the calculated thickness is 50/9=5.56 ft, or a little less than ½ the 12' thickness of the dry insulation.

In practice, after the water evaporates, the wet insulation will have a thinner layer and the heat absorbing capacity of the dry rock is less. Once dry, a thin layer heats quickly such that the beneficial effect is more on the order of 2 to 1 than 4 to 1, as shown by the comparison of 5.56 ft to 12 ft thickness.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A thermal insulation system comprising:
   a body of heated material at a first temperature;
   an insulating layer comprising an insulating material adjacent to and in fluid communication with the body of heated material, wherein the insulating layer contains a distributed liquid water in an amount sufficient to cool the insulating layer through evaporative vapor flow toward the body of heated material; and
   a heat sink material adjacent to the insulating layer and opposite from the body of heated material, wherein the heat sink material is at a second temperature lower than the first temperature.

2. The thermal insulation system of claim 1, wherein the amount of water contained by the insulating layer is not greater than a saturation amount.

3. The thermal insulation system of claim 1, wherein the heat sink material is temperature sensitive to the first temperature.

4. The thermal insulation system of claim 1, wherein the heat sink material is a vapor impermeable material.

5. The thermal insulation system of claim 1, wherein the heat sink material comprises a hydrated clay.

6. The thermal insulation system of claim 5, wherein the hydrated clay is selected from the group consisting of bentonite, montmorillonite, kaolinite, illite, chlorite, vermiculite, and mixtures thereof.

7. The thermal insulation system of claim 1, wherein the first temperature is above the boiling point of water and second temperature is below the boiling point of water.

8. The thermal insulation system of claim 1, wherein the first temperature is from about 95° C. to about 500° C. and the second temperature is from about 0° C. to about 95° C.

9. The thermal insulation system of claim 1, wherein the heated material is a hydrocarbonaceous material such that the evaporative vapor flow also strips and carries hydrocarbon product toward the heated material.

10. The thermal insulation system of claim 1, wherein the insulating material is a particulate material.

11. The thermal insulation system of claim 10, wherein the insulating material is a particulate earthen material.

12. The thermal insulation system of claim 11, wherein the insulating material is spent oil shale.

13. The thermal insulation system of claim 10, wherein the insulating material has a weight-average particle size from 1 mm to 5 cm.

14. The thermal insulation system of claim 1, wherein the insulating layer contains from about 5% to about 15% water by weight.

15. The thermal insulation system of claim 1, wherein the insulating layer includes a continuous vapor phase.

16. The thermal insulation system of claim 1, wherein the insulating layer surrounds the body of heated material so that the body of heated material is encapsulated in the insulating layer.

17. The thermal insulation system of claim 16, wherein the heat sink material surrounds the insulating layer so that the insulating layer and body of heated material are encapsulated in the heat sink material.

* * * * *